United States Patent [19]

Lehureau et al.

[11] 3,915,730

[45] Oct. 28, 1974

[54] BITUMINOUS COMPOSITIONS COMPRISING DIEPOXIDIZED HYDROGENATED BISPHENOL A

[75] Inventors: Jean Lehureau, Lyon; Jean-Philippe Rieux, Decines, both of France

[73] Assignee: Rhone-Progil, Paris, France

[22] Filed: Feb. 28, 1974

[21] Appl. No.: 446,774

Related U.S. Application Data

[63] Continuation-in-part of Ser. No. 242,225, April 7, 1972, abandoned.

[52] U.S. Cl. ............ 106/279; 106/280; 106/281 N; 106/281 R; 260/28
[51] Int. Cl.² .. C08J 3/18; C08K 5/06; C08L 95/00; C09D 3/46
[58] Field of Search ............................ 106/273–284; 260/28, 285 AS

[56] References Cited
UNITED STATES PATENTS

| | | | |
|---|---|---|---|
| 2,633,458 | 3/1953 | Shokal | 260/30.4 R X |
| 2,765,288 | 10/1956 | Whittier | 260/28 |
| 2,980,601 | 4/1961 | Meigs | 260/28 X |
| 3,033,088 | 5/1962 | Whittenwyler | 260/28 X |
| 3,219,602 | 11/1965 | Scheibli | 260/28 X |
| 3,297,056 | 1/1967 | McLaughlin et al | 260/285 AS X |
| 3,488,404 | 12/1967 | Parker, Jr. | 260/830 |
| 3,514,418 | 5/1970 | Schwarzer | 260/28 |

FOREIGN PATENTS OR APPLICATIONS 996,499    6/1965    United Kingdom

OTHER PUBLICATIONS

Abraham, Asphalts and Allied Substances, Fifth Ed., Vol. 1, Published by D. Van Nostrand Co. Inc., N.J., 1945.

*Primary Examiner*—Joan E. Welcome
*Attorney, Agent, or Firm*—Bacon & Thomas

[57] ABSTRACT

2,2-bis(4-cyclohexanol)propane diglycidyl ether is extremely compatible with bitumen thereby allowing the inclusion of major proportions of bitumen in bituminous compositions which have improved properties as a consequence thereof.

8 Claims, No Drawings

BITUMINOUS COMPOSITIONS COMPRISING DIEPOXIDIZED HYDROGENATED BISPHENOL A

CROSS-REFERENCE TO RELATED APPLICATION

This application is a continuation-in-part of copending application Ser. No. 242,225, filed Apr. 7, 1972, now abandoned.

BACKGROUND OF THE INVENTION

This invention relates to new compositions containing diepoxidized hydrogenated bisphenol A, bituminous materials and a curing agent, which compositions are particularly useful as surface coatings for roadways, walkways, and similar heavily traveled areas and for making concretes, mortars, sealing and priming coatings for bridges, viaducts, terraces and other industrial coatings.

Compositions for use in the construction of roadways, airport runways, walkways, and the like must possess certain characteristics in order to be effective in their intended field of use. Such compositions, for example, should evidence a high resistance to varying climatic conditions, heat, wear and the wide variety of solvents which come into contact with such surfaces. Further, the compositions should have sufficient flexibility to be used in making surface and other joints, as well as have the adhesiveness necessary in the fabrication of coatings for concrete, asphalt, or metal surfaces. Moreover, these compositions must meet all the foregoing requirements without adversely affecting the skid properties, traction strength and final hardness of the surfaces.

Numerous compositions have been suggested to solve the various problems encountered in the preparation of bituminous containing materials. However, in most cases the proposed compositions have failed to meet all the requirements outlined above and have proved to be unsatisfactory.

Various processes have also been proposed to improve the characteristics of previously known compositions; for example, in U.S. Pat. No. 3,488,404, dated Dec. 18, 1967, reactive diluents, such as alpha, omega-diepoxyalkanes are incorporated in epoxy resins to reduce the viscosity and thereby improve the adhesive qualities of the resin without altering the traction strength and final hardness of the resin compositions. However, heat resistance is notably lowered by the inclusion of the diluent, the compositions becoming unstable above about 60°C., which temperature is often reached upon coating surfaces.

Moreover, the proportion of bituminous material in these prior art compositions is limited to about 15% by weight as a consequence of the incompatibility between bitumen and resin at higher proportions. This drawback significantly reduces the acceptability of these compositions owing to the relatively high cost of resin in comparison to bitumen. Therefore, attempts have been made to increase the compatibility between bitumen and resin as, for example, in British Pat. No. 996,499, dated June 14, 1961, which proposes the use of an aromatic petroleum fraction, the diluting and solvating action of which tends to increase product compatibility and decrease mixture viscosity. However, the physical characteristics of the final product are detrimentally altered by the proposed combination.

SUMMARY OF THE INVENTION

It is therefore, a primary object of this invention to provide new bitumen containing compositions suitable for use in the construction of concrete and mortars, and the treatment of roadways, walkways, terraces, runways and the like, which compositions exhibit increased resistance to weather, heat, wear, solvents, and further which retain excellent traction strength, final hardness, and other essential physical properties.

It is a further object to provide new compositions which may be used as coatings for concrete, asphalt, wood and metal surfaces.

It is a further object to provide compositions which possess the degree of flexibility required for the achievement of joints in road surfaces or the like.

Still another object of this invention is to provide compositions comprising epoxy resins and bitumen wherein the compatibility between the two components is significantly increased.

Another object is to provide new surfacing or coating compositions which are relatively inexpensive to use and can be easily applied to large surface areas of concrete, asphalt, wood, metal, etc., or function as primary structural or supportive materials.

Other objects, features and advantages of the invention will be apparent to those skilled in the art from the detailed description of the invention which follows.

DETAILED DESCRIPTION OF THE INVENTION

In commonly owned copending U.S. Pat. application Ser. No. 150,743, filed June 7, 1971, it has been shown that the use of polyepoxy ethers and especially those obtained from the reaction of diepoxydized bisphenol A with a polyol increase the compatibility and improve the physical characteristics of bituminous compositions after curing.

It has now been unexpectedly found that 2,2-bis(4-cyclohexanol)propane diglycidyl ether (diepoxidized hydrogenated bisphenol A, typically designated "epoxidized DCHP"), is inherently compatible with bitumen in any proportion without being transformed into the polyepoxy ether of the epoxidized DCHP as is necessary with the parent bisphenol A compound as discussed in the aforementioned copending application.

Therefore, there is provided by the present invention a new composition comprising 2,2-bis(4-cyclohexanol)propane diglycidyl ether, alternatively known as diepoxidized hydrogenated bisphenol A, bituminous material, and a suitable curing agent, in which the bituminous material represents at least about 10% by weight, and preferably contains at least about 50% by weight.

The inclusion of the diepoxidized hydrogenated bisphenol A in the bituminous compositions of this invention effectively enhances the resistance of these compositions to destructive conditions without altering the physical properties of the final product and therefore these compositions have a wide variety of applications. The expression "constructional unit" is used herein to designate these applications and is intended to include roadways, walkways, runways, terraces, bridges, ship decks, tennis courts, and analogous surfaces having applied thereto the compositions of this invention as well as concretes, mortars, and the like containing the instant composition which form the ultimate supportive or joining materials and further all coatings, joints, surfaces, etc., comprised entirely of the compositions of the present invention The diepoxidized hydrogenated bisphenol A of this invention which contains on an average more than one epoxy group in the molecule may be obtained from the condensation of hydrogenated bisphenol A (DCHP), crude or purified, with an epihalohydrin, such as epichlorohydrin in the presence of boron trifluoride catalyst. The diepoxidized hydrogenated bisphenol A obtained in this manner is a mixture of monomer and polymer, the degree of polymerization being dependent upon the relative proportions of coreagents and catalyst employed in the preparation of same. The resultant mixture is characterized by an average epoxide oxygen content of between 50 and 100% of theoretical and may be used in the compositions of this invention as crude material obtained immediately upon condensation or after rectification under vacuum.

The amount of diepoxidized hydrogenated bisphenol A utilized in the bituminous compositions of this invention is preferably between about 10 and about 45% by weight.

The bituminous materials employed in the present invention may be road bitumen characterized by the presence of asphaltenes coated with maltenes, and having a penetrability index of between about 20 and about 300. However, the bituminous materials contemplated by this invention include substances, such as, residual combustible oils, petroleum extracts rich in aromatic compounds having high boiling points, asphalts, and bitumen obtained from direct distillation, or blown, cracked and catalytically or non-catalytically polymerized bitumen.

As used herein, the term "bituminous material" has reference only to those substances which are derived entirely from petroleum and which are soluble in carbon disulfide and insoluble in water after treatment with boiling sulfuric acid. Further, the term specifically does not include products obtained from coal, such as, coal tar, refined coal tar or coal tar pitch inasmuch as these coal distillation products are generally satisfactorily compatible with epoxides utilized in building and coating compositions while the bituminous materials defined above are relatively incompatible with conventional epoxide additives.

While the bituminous materials represent at least 10% by weight of the total composition, and preferably at least 50% by weight, the percentage upper limit with respect to bitumen content is determined by the compatibility of the diepoxidized hydrogenated bisphenol A with the bitumen.

The preferred curing agents used in the compositions of this invention are aminated compounds having free hydrogen atoms, such as, polyalkylene amines, aminoamines, amido-amines of polymerized linoleic acid, methylene bridge amines, and amines without the methylene bridge such as polyamino-phenol complexes, etc.

Moreover, in order to obtain more rapid curing of the compositions according to the present invention, it is possible to incorporate accelerating agents, such as, triethanolamine, phenol compounds, such as, phenol, cresols, dimethylaminomethylphenol, salicylic acids, lactic acid, etc.

The preferred amine type curing agents are generally present in an amount between about 10 and about 45%.

It is further possible to incorporate various additives in the compositions of this invention, such as, surface-active agents, adhesive agents which improve adhesion between the coating and support, activated or non-activated fillers, reactive or unreactive solvents, small particles of inert aggregates, for example, sand, crushed rocks, finely divided shells, aluminum oxide, and pigments, etc.

In order to further illustrate the present invention and the advantages thereof, the following specific examples are given, it being understood that the same are intended only as illustrative and in no wise limitative.

Tables 1, 2 and 3 hereinafter specify the origin of the resin used in the preparation of eight different bituminous compositions. The viscosities reported therein were obtained by testing the products on Brookfield LTV apparatus. Polyepoxides obtained from hydrogenated non-recrystallized bisphenol A:

Table 1

| Origin | Viscosity |
| --- | --- |
| Crude | <20 poises |
| Residual fraction after topping of 1 under vacuum | <20 poises |
| Head fraction | <5 poises |
| Distillation residue after removal of 2 and 3 | <20 poises |

Polyepoxides obtained from hydrogenated bisphenol A, purified in toluene:

Table 2

| Origin | Viscosity |
| --- | --- |
| Crude | <20 poises |
| Center fraction isolated by vacuum distillation | <20 poises |

As a comparison, compositions were prepared from non-hydrogenated bisphenol A:

Table 3

| Origin | Viscosity |
| --- | --- |
| % of epoxy = 8.6% | 170 poises |
| % of epoxy = 8.6% | 170 poises |

Compositions were prepared utilizing the resins described above, bitumen, and curing agent in the quantities set forth in Table 4 by admixing the epoxide at a temperature of 70°C., while stirring, with a bitumen having a penetrability index of 180 to 220. The bitumen and epoxide are considered to be compatible if no separation occurs. Then the curing agent, which is "Versamid 140" (registered trademark) is incorporated into the bitumen-epoxide mixture. The resultant mixtures are next cast onto a metal plate at a temperature near 50°C. and the plates thus obtained are stripped after 48 hours and maintained 2 days at 50°C. and 1 day at 20°C. Then they are submitted to dynamometer mechanical tests, the results of which are given in Table 4, hereinunder.

Table 4

| Epoxide | % of epoxide in composition | % of bitumen in composition | % of curing agent in composition | Compatibility | Traction lengthening % | Traction strength kg/cm² |
|---|---|---|---|---|---|---|
| 1 | 24 | 60 | 16 | yes | 25 | 40 |
| 1 | 30 | 50 | 20 | yes | 30 | 62 |
| 2 | 57 | 10 | 33 | yes | 3 | 400 |
| 2 | 44 | 30 | 26 | yes | 5 | 310 |
| 2 | 29 | 50 | 21 | yes | 6 | 120 |
| 3 | 31.5 | 50 | 18.5 | yes | creeping | creeping |
| 4 | 33.3 | 50 | 16.7 | yes | 4 | 100 |
| 5 | 28.3 | 50 | 21.7 | yes | 30 | 90 |
| 6 | 27.8 | 50 | 22.2 | yes | 10 | 85 |
| 7 | 42.5 | 15 | 42.5 | yes | 1 | 250 |
| 8 | 40 | 20 | 40 | no | — | — |

It is apparent from the foregoing results that mixtures 7 and 8 which contain non-hydrogenated bisphenol A are below the level of performance evidenced by the compositions of this invention.

EXAMPLE 1

5 kg of bitumen having a penetrability index of 180 to 200 and 2 kg of "Versamid 140" are added to 3 kg of epoxide No. 1 (Table 1). The mixture, in the form of a thin layer about 3 mm. thick is spread onto a previously sanded metal plate and cured at room temperature. The coating, after having been submitted to severe tangential strains (frequent passages of heavy vehicles) and to bad weather over a 3-month period, does not manifest any cracking. Adherence to the metal plate has been excellent, and there is no evidence of rust formation.

EXAMPLE 2

Into the mixture of Example 1, 75 kg of sand are added and the composition is mixed. Then the composition is used as yard coating. After 10 days of curing, the coating is adhesive, flexible, less brittle to shock and moreover has good resistance with regard to gasoline, gas-oil and lubricating oils. After three months, the compression strength has not decreased.

Thus, there is obtained according to this invention a composition comprising a bituminous material, diepoxidized hydrogenated bisphenol A, and a suitable curing agent therefor wherein the bituminous material is compatible with the epoxide in any desired proportion and which compositions have an improved resistance to adverse climatic conditions, wear, heat and solvents while retaining the requisite qualities of flexibility, adhesiveness, traction and strength for use in the preparation of constructional units.

While the invention has been described and pointed out with reference to certain preferred embodiments thereof, those skilled in the art will appreciate that various changes and modifications and substitutions can be made without departing from the spirit of the invention. It is intended, therefore, that the invention be limited only by the scope of the claims which follow.

What is claimed is:

1. A composition of matter comprising between about 10 to 45% of 2,2-bis(4-cyclohexanol) propane diglycidyl ether, at least 10% of crude bituminous material and between about 10 to 45% of curing agent, wherein said 2,2-bis(4-cyclohexanol) propane diglycidyl ether is obtained from the condensation of hydrogenated bisphenol A with an epihalohydrin and said 2,2-bis(4-cyclohexanol) propane diglycidyl ether is a mixture of monomer and polymer characterized by an average epoxide oxygen content of between 50 and 100% of theoretical, said 2,2-bis(4-cyclohexanol) propane diglycidyl ether being compatible with said bituminous material without being transformed into the polyepoxy ether of said 2,2-bis (4-cyclohexanol) propane diglycidyl ether and wherein said bituminous material has a penetrability index of between about 20 and 300 and limited to the bituminous products derived entirely from petroleum, soluble in carbon disulfide and insoluble in water after treatment with boiling sulfuric acid.

2. The composition of matter as defined by claim 1 wherein the bituminous material represents at least about 10% by weight.

3. The composition of matter as defined by claim 1 wherein the bituminous material represents at least about 50% by weight.

4. The composition of matter as defined by claim 3 wherein the bituminous material is asphalt.

5. The composition of matter as defined by claim 1 wherein the curing agent is a nitrogen containing compound.

6. The composition of matter as defined by claim 6 wherein the nitrogen containing compound is selected from the group consisting of aliphatic amines, cycloaliphatic amines, aromatic amines, amino-acids, amino-amines of polymerized linoleic acid, alkylene amines, and polyamino-phenol complexes.

7. A constructional unit comprised of the composition of matter as defined by claim 1.

8. The composition of matter as defined by claim 1 wherein the bituminous material has a penetrability index of between about 180 and 220.

* * * * *

UNITED STATES PATENT OFFICE
CERTIFICATE OF CORRECTION

PATENT NO. : 3,915,730
DATED : October 28, 1975
INVENTOR(S) : Lehureau et al

It is certified that error appears in the above-identified patent and that said Letters Patent are hereby corrected as shown below:

In the heading, please change the patent date from

"[45] Oct. 28, 1974" to -- [45] Oct. 28, 1975 --.

Signed and Sealed this

Tenth Day of August 1976

[SEAL]

Attest:

RUTH C. MASON
*Attesting Officer*

C. MARSHALL DANN
*Commissioner of Patents and Trademarks*